United States Patent [19]

Horvath, Jr. et al.

[11] Patent Number: 5,529,244
[45] Date of Patent: Jun. 25, 1996

[54] ASPIRATOR LIQUID BLENDING DEVICE USING MULTIPLE RESTRICTORS

[75] Inventors: Stephen R. Horvath, Jr., Caledonia; Charles E. Seaman, Jr., Somers, both of Wis.

[73] Assignee: S. C. Johnson & Son, Inc., Racine, Wis.

[21] Appl. No.: 317,974

[22] Filed: Oct. 4, 1994

[51] Int. Cl.⁶ .................................................. B05B 7/30
[52] U.S. Cl. .................................................. 239/318; 138/44
[58] Field of Search .................................. 239/10, 310, 318, 239/433; 138/40, 44

[56] References Cited

U.S. PATENT DOCUMENTS

| | | | |
|---|---|---|---|
| 2,571,871 | 10/1951 | Hayes | 239/318 X |
| 2,811,389 | 10/1957 | Fischer | 299/84 |
| 2,991,939 | 7/1961 | Packard | 239/114 |
| 3,104,823 | 9/1963 | Hayes | 239/304 |
| 3,181,797 | 5/1965 | Hayes | 239/317 |
| 3,445,067 | 5/1969 | Sheldall | 239/318 |
| 3,726,468 | 12/1973 | Davenport | 239/310 |
| 3,940,069 | 2/1976 | Gunzel et al. | 239/318 |
| 4,029,260 | 6/1977 | Herrick | 239/282 |
| 4,058,296 | 11/1977 | Wetherby | 366/160 |
| 4,068,681 | 1/1978 | McNair et al. | 137/588 |
| 4,197,872 | 4/1980 | Parker | 137/115 |
| 4,878,619 | 11/1989 | Norman | 239/318 |
| 4,901,923 | 2/1990 | McRoskey et al. | 239/123 |
| 5,228,598 | 7/1993 | Bally et al. | 222/129 |

FOREIGN PATENT DOCUMENTS

| | | | |
|---|---|---|---|
| 1029160 | 5/1966 | United Kingdom | 239/318 |
| WO91/16138 | 10/1991 | WIPO . | |

OTHER PUBLICATIONS

Brochure on Solutions Center® Dispenser entitled "Cleaning Programs Made Simple" from S C Johnson Wax Commercial Markets Division, S. C. Johnson & Son, Inc., Racine Wisconsin, 6 pages, 1991.

Primary Examiner—Kevin P. Weldon
Attorney, Agent, or Firm—R. E. Rakoczy; J. W. Frank

[57] ABSTRACT

An improved aspirator device for the accurate blending of an additive liquid such as a liquid concentrate with a pressurized stream of a main liquid such as water. The improvement involves the use of a metering means composed of at least two plastic injection molded restrictors in serial communication. Each restrictor has, as its smallest diameter fluid passage, a hollow bore of from about 0.005 inches to 0.010 inches in diameter and from about 0.005 inches to 0.010 inches in length wherein the dimensions of each hollow bore are such to provide a volume:volume dilution ratio of the additive liquid to the main liquid of from about 1:500 to 1:2,500.

4 Claims, 2 Drawing Sheets

ASPIRATOR LIQUID BLENDING DEVICE USING MULTIPLE RESTRICTORS

TECHNICAL FIELD

This invention relates to an improved aspirator device for accurately blending small quantities of a first liquid with a second liquid using a metering device to control the flow of the first liquid that comprises at least two molded plastic liquid flow restrictors.

BACKGROUND ART

Aspirator devices which rely on the venturi effect to create a vacuum and draw a first liquid into a second pressurized liquid flowing past an orifice are well known in the art. For example, Published PCT Patent Application No. WO 91/16138 to Horvath et al. teaches a precision-ratioed fluid-mixing device and system that uses an aspirator device to meter a quantity of a liquid concentrate such as a cleaner liquid disinfectant into a pressurized stream of water from a household water plumbing line to obtain a ready-to-use aqueous cleaning or disinfecting solution. Horvath et al. use a combination of two orificed metering elements which together limit the flow of the concentrate into the pressurized stream of water. One such metering orifice is located in the aspirator itself (cylindrical orifice 230 of nominal diameter 0.080 inches) and the other is a removable metering element located in the diptube extending into the container holding the liquid concentrate. Horvath et al. teach that the nominal diameter of the orificed inlet 188 in the removable metering element could range between 0.006 inches to 0.071 inches.

A commercial system of the type described in the Horvath et al. patent application has been sold since 1991 under the brand name of SOLUTIONS CENTER™ by the S. C. Johnson Professional Products Division of S. C. Johnson & Son, Inc. of Racine, Wis. The SOLUTIONS CENTER™ system also uses a combination of two metering elements, but one metering element of either about 0.048 inches or 0.103 inches in diameter is molded into the top of an apertured plug pressed into the neck of the plastic concentrate container. A removable metering element located in the diptube extends into the container from the apertured plug and is serially connected to the other metering element in the plug. The removable metering element used depends upon the product to be dispensed and thus the dilution ratio desired. The orifices in the removable metering elements range from 0.005 inches to 0.045 inches in diameter. The apertured plug is connected to a tube leading to the venturi in the aspirator device so that the contents of the liquid concentrate container are drawn into the flowing stream of water when a valve is opened by pressing a button to start the flow of water through the aspirator. Since the concentrate container (additive liquid) has both metering orifices, the user simply attaches a concentrate container to the system and does not have to select a metering orifice to obtain a properly diluted solution.

Another example of commonly known aspirator device is a garden hose-end sprayer which is used to apply lawn fertilizers and insecticides. One example of such a device is shown in U.S. Pat. No. 4,068,681 to McNair et al. McNair et al. teach a hose-end sprayer that has a reservoir container that is filled with a dry dissolvable solid lawn chemical. The reservoir container is attached to the device and automatically fills with water when water flows through the hose. A diptube in the container is connected to an aspirator that has an upper orifice and a closed opposite end containing a series of small orifices. The device also has a water bypass line which permits water to be forced into the reservoir container that is filled with the solid chemical. During filling of the reservoir container, the pressure of the water coming through the aspirator forces water backwards through the diptube into the reservoir container and out through the small orifices located in the bottom of the diptube. The result is a series of high velocity water streams that agitate the dry chemical in the bottom of the container and assist in dissolving the chemical in the water being admitted.

The improvement described by McNair et al. relates to a valve system located in the upper part of the reservoir container. Once the container is filled with water, the valve closes to stop the escape of air from the container through the valve. A small amount of water is forced into an opening that then reverses the flow of water through the diptube. A small amount of the dissolved chemical is drawn through the small orifices in the bottom of the diptube and up through the diptube to a metering orifice into the main water stream by way of the venturi effect. The metering function appears to be handled by the orifice near the aspirator rather than by the small orifices at the opposite bottom end of the diptube. Further metering can also be accomplished by another metering jet.

U.S. Pat. No. 4,058,296 to Wetherby teaches the use of check valves in the bottom of the diptube in an aspirator device to prevent backflow of the pressurized liquid into a liquid concentrate into the liquid concentrate container. Column 1, lines 18–43 cites as prior art a certain mixing apparatus that uses a bypass conduit arrangement in combination with, among other things, a series of conduit restrictions. No reference is given to any specific patent that might describe such a system. Such references may be to U.S. Pat. Nos. 3,104,823 and 3,181,797 to Hayes that describe aspirator devices for blending liquids which use restrictors in the form of bushings. The restrictors are said to provide a pressure drop in the conduit system that is divided into two separate paths comprising a main conduit and a bypass conduit. These bushings or restrictors are used to divide up the flow of the diluted concentrate provided by the aspirator devices.

For reasons of economy and efficiency, it is becoming more and more desirable to use dilution systems that use highly concentrated liquids that require high dilution ratios such as from about 1:500 to 1:2,500 parts by volume of the concentrate liquid to the main liquid such as water. Accurate dilutions are important to avoid the waste of concentrate that inevitably occurs when the liquid concentrate is manually measured out into a quantity of main liquid such as water. Use of too much concentrate can also have detrimental effects such by leaving unwanted residues of the active ingredients on surfaces being treated. For example, a volume dilution ratio of 1:256 requires the careful measurement of 0.5 ounces of concentrate and dissolving that concentrate in 1 gallon of water. To achieve a volume dilution ratio of 1:512, 0.25 ounces of concentrate must be added to a gallon of water. If only a quart of diluted liquid is desired, then the quantity of concentrate to be measured is very small indeed. This is simply not convenient for a maintenance user and waste of the concentrate is almost inevitable.

An even more important consideration is when a sanitizer or disinfectant liquid is being prepared. Accurate dilution of the concentrate is critical to obtain a solution which will have the required disinfecting properties. If the solution is too dilute, then bacteria will not be adequately removed by the solution. That can create problems in a hospital or other institutional setting where proper removal of bacteria is important. Since inaccurate dilutions can create problems, conscientious maintenance personnel tend to use too much concentrate which results in waste of the concentrate.

Molded plastic components that are often made by injection molding are often used in aspirator devices of the above type for reasons of economy and simplicity of manufacture. High dilution ratio devices require the use of restrictors containing very small orifices. There is a limit as to the diameter and length ("land") of an orifice that can be injection molded because the pin used to form the orifice can be warped or broken as plastic is injected at high pressure if the diameter of pin is too small for its length to handle the pressure. Generally, orifices of smaller than about 0.005 inches in diameter with land lengths longer than the diameter cannot be injection molded from plastic. The land length is important to the dilution ratio of liquid concentrate to main liquid. The viscosity of the liquid concentrate affects its flow through the orifice in the restrictor. Generally, a longer land length is needed for higher liquid dilution ratios, but this is not technically feasible for a single restrictor because of molding technology limitations. A practical dilution ratio limit for a single restrictor is about 1:750.

Use of additional operations such as laser drilling to create the desired orifice in a plastic restrictor is often not effective because the heat of the laser melts the plastic and makes creates an undesirable variability in the diameter and land length of the plastic restrictor. Drilling with fine drills is so labor intensive and time consuming that it is typically not economical to commercially make restrictors by such a method.

Thus, there is still a need for an improved aspirator device for blending two liquids that can accurately provide volume dilution ratios of a liquid concentrate to a main liquid such as water of from about 1:500 to 1:2,500.

SUMMARY DISCLOSURE OF THE INVENTION

One object of the present invention is to provide an improved aspirator device for accurately blending, by way of the venturi effect, an additive liquid such as a liquid concentrate with a pressurized main liquid at a volume dilution ratio of from about 1:500 to 1:2,500. Another object is to provide such a device where the metering means used to achieve such dilutions is readily manufactured from plastic materials using conventional molding procedures, preferably injection molding procedures. Yet another object of the present invention is to provide an improved aspirator device where the metering means is fully contained within a liquid concentrate container so that the desired dilution ratios are achieved simply by attaching the concentrate container to the aspirator device without further measurement or intervention needed by the user. It is a further object of the present invention to provide a metering means composed of two or more plastic injection molded restrictors in serial communication having readily injection moldable orifices with a diameter and land length that operate together to provide accurate high dilution ratios.

These and other objects of the present invention are provided by an aspirator device for accurately blending a pressurized main liquid passing through an aspirator with a metered quantity of an additive liquid contained within a reservoir wherein passage of main liquid through the aspirator causes the additive liquid to be drawn into the main liquid by way of venturi action from the reservoir through a metering means, the improvement characterized by the metering means comprising at least two molded plastic liquid flow restrictors that are in serial flow communication with the additive liquid, each such restrictor having as its smallest diameter fluid passage a hollow bore of from about 0.005 inches to 0.010 inches in diameter and up to about 0.010 inches in length wherein the length does not substantially exceed the diameter and the amount of main fluid flowing through the aspirator and the dimensions of each hollow bore are such as to provide a volume:volume dilution ratio of the additive liquid to the main liquid of from about 1:500 to 1:2,500.

BRIEF DESCRIPTION OF THE DRAWINGS

The above and other objects, features and advantages of the present invention will become apparent to those skilled in the art upon an examination of this specification and the accompanying drawings.

In the drawings.

BEST MODE OF CARRYING OUT THE INVENTION

Figure 1:
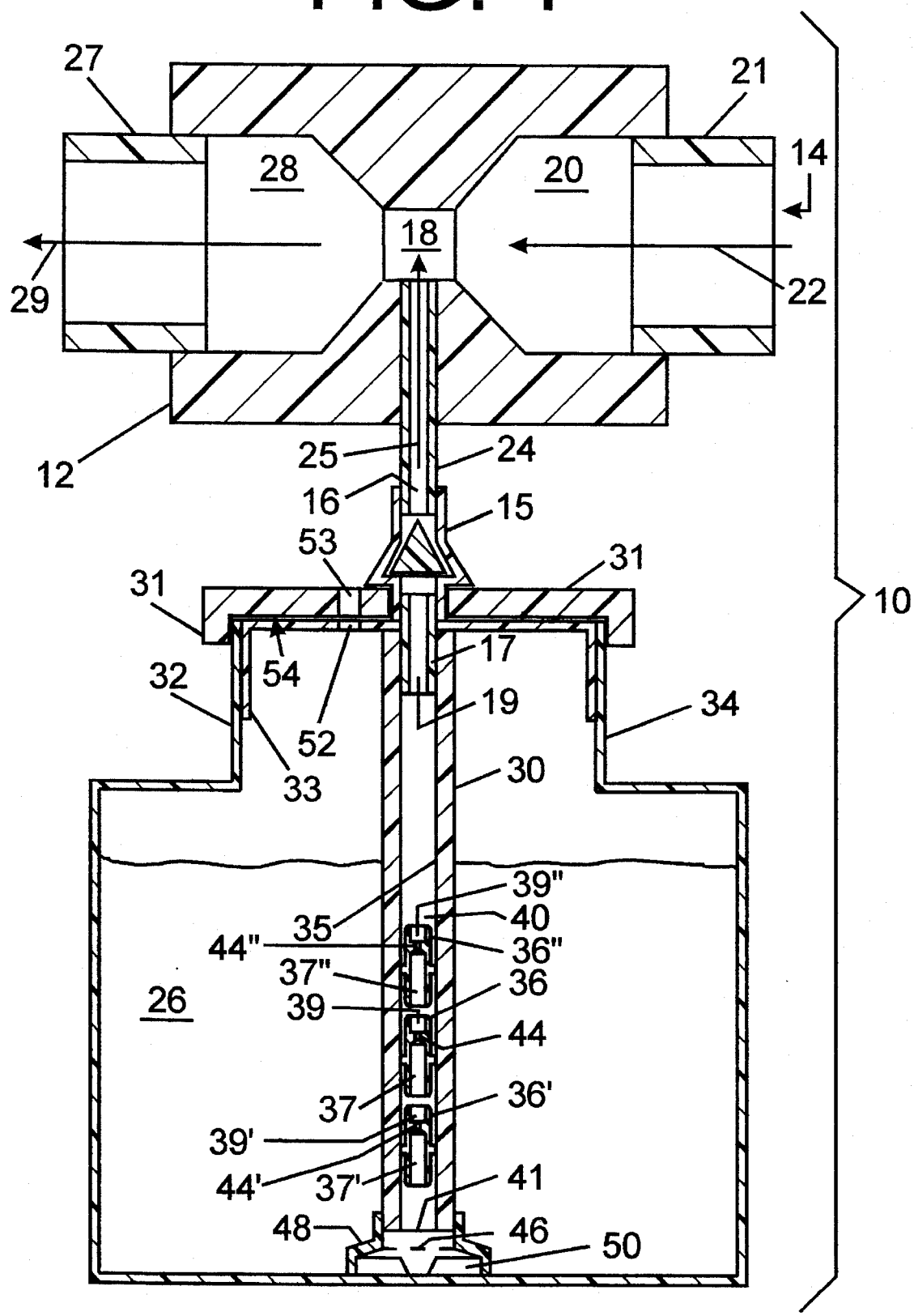
FIG. 1 is a cross-sectional view of an improved aspirator device of the present invention.

In the drawings, like features are referred to by like reference numerals.

Referring to the drawings, FIG. 1 is a simplified cross-sectional view of aspirator device 10 which comprises a conventional aspirator 12 composed of tube 14 having entry chamber 20 and exit chamber 28 with channel 18 positioned between chambers 20 and 28 where channel 18 has a smaller diameter than chambers 20 and 28. A pressurized liquid such as water from a water main enters entry chamber 20 by means of a rubber or plastic hose 21 or other conduit that is affixed to chamber 20 in a conventional manner such as by a threaded pipe connection, friction fitting, solvent bonding or a clamping arrangement. A conventional shutoff valve (not shown) is used to start and stop the flow of pressurized liquid through aspirator 12.

The pressurized water flows in the direction of arrow 22 and increases in velocity as it passes through narrower channel 18 containing additive tube 24. As a result of the venturi effect, the movement of the water passing over tube 24 creates a vacuum in passage 16 of tube 24 which draws additive liquid 26—which may be a liquid concentrate— through passage 16 in the direction of arrow 25. Additive liquid 26 is drawn into channel 18 where it mixes with the water passing through channel 18 into exit chamber 28 to form an accurately diluted water solution of additive liquid 26. That solution flows out of aspirator 12 in the direction of arrow 29 through a rubber or plastic exit hose 27 or other conduit for use.

To reach channel 18, additive liquid 26 flows through a series of passages through neck 32 of reservoir container 34 which stores additive liquid 26. Tube 24 is connected to diptube 30 that contains three restrictors 36, 36', 36" with flanges 38, 38' (see FIG. 2) that have a slightly larger diameter than the inside diameter of passage 40 in diptube 30. Tube 14 may be conventionally attached to neck 32 by means of a screw cap, plug or other connection means. FIG. 1 shows cap 31 which is fixed over neck 32 in a sealing fashion such as by means of screw threads (not shown).

More preferably, a conventional check valve 15 is connected to tube 24 between tube 24 and diptube 30, as shown, or alternatively mounted as part of diptube 30 (not shown), which permits additive liquid to flow in the direction of arrow 25. However, check valve 15 prevents pressurized liquid in chamber 18 from traveling opposite the direction of arrow 25 back into container 34 which would dilute additive liquid 26 and result in a solution with an incorrect volume dilution ratio. As shown, check valve 15 is mounted on cap 31 and tube 17 serves to provide a connection between check valve 15 and diptube 30. Diptube 30 is made of a flexible plastic such as polyethylene or polypropylene so that flange 38 forms a seal between the outer edge 42 of flanges 38 and wall 35 of passage 40 in diptube 30. Container 34 may be made of a plastic such as polyethylene, polypropylene or other suitable plastics.

Neck 32 of container 34 is sealed by means of a plastic friction fit plug 33 which permits check valve 15 and tube 17 to be joined together in a sealing fashion. Cap 31 can be removed so that a new container 34 of additive liquid 26 can be substituted when the additive liquid from a previously attached container 34 is depleted or if a different additive liquid is to be dispensed from aspirator device 10.

Thus, additive liquid 26 is drawn into chamber 18 through passage 16, check valve 15, passage 19, and passage 40 as well as through orifices 44, 44', 44" of restrictors 36, 36', 36". Restrictors 36, 36', 36" serve to meter the flow of additive liquid 26 from reservoir container 34 through screen 46 on screen holder 48 affixed to end 41 located at the bottom of diptube 30. Holder 48 contains bottom openings 50 which permit additive liquid 26 to pass into the bottom of holder 48 through screen 46 into passage 40 and ultimately into channel 18. A screen is preferred to prevent small crystals or other materials from plugging fine orifices 44, 44', 44". The size of the screen opening may have an effect on the volume dilution ratios obtained by restricting the flow of additive liquid 26. This should be taken into consideration when making the improved aspirator device of the present invention.

Outside air passes through vent 53 in cap 31 into open space 54 between cap 31 and plug 33 and finally through vent 52 in plug 33 into container 34. Air is admitted to container 34 as additive liquid 26 is drawn into the main liquid stream in chamber 18. This prevents the formation of a vacuum in container 34 that could affect the dilution ratios obtained by reducing the flow of additive liquid 26 into the main liquid.

The Horvath et al. precision-ratioed fluid-mixing device and system noted above gives an example of an aspirator device to which the present invention could be applied. The Horvath et al. PCT Patent Application derives priority from U.S. Ser. No. 07/513,401 filed on Apr. 23, 1990 now abandoned which is hereby incorporated by reference to teach an aspirator device and system which would be improved by the use of the present invention.

Figure 2:
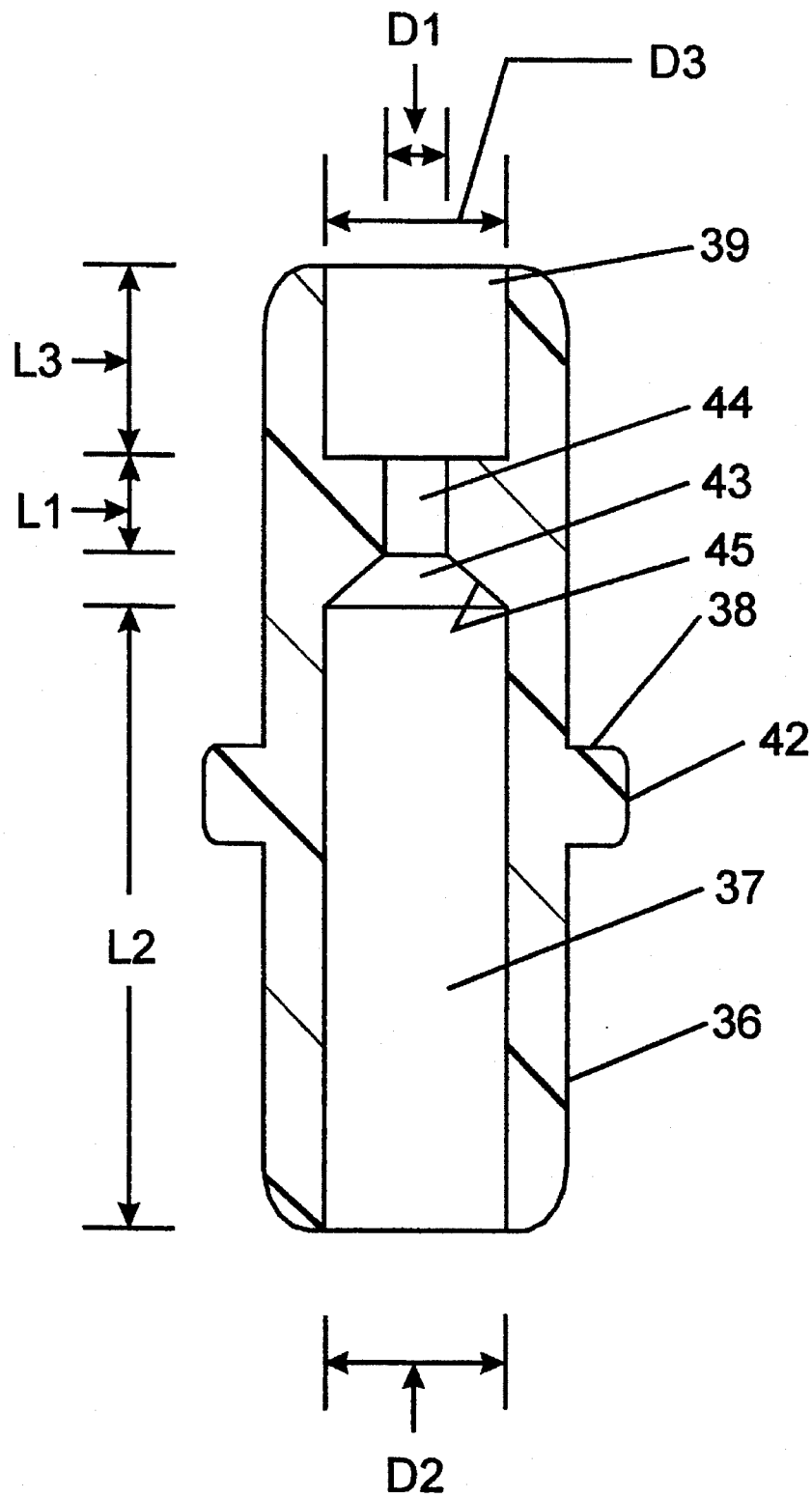
FIG. 2 is a cross-sectional view of a restrictor of the present invention.

FIG. 2 is a cross-sectional view of restrictor 36—restrictors 36' and 36" have the same configuration where reference numerals with an apostrophe ("'") correspond to the same reference numerals in FIG. 2. FIG. 2 better shows the internal details of restrictor 36 that include hollow cylindrical bore or orifice 44 having diameter D1 and land L1, longer cylindrical bore or passage 37 having diameter D2 and land L2, and shorter cylindrical bore or passage 39 having diameter D3 and land L3. To achieve the objectives of the present invention, a small diameter orifice is used wherein D1 is from about 0.005 inches to 0.010 inches in diameter. A typical tolerance on small restrictor orifice diameters is ±0.0002 inches. To injection mold such a small diameter orifice, the length of the land formed by a corresponding pin in the mold is typically no greater than the diameter of the bore or orifice. Thus, the length of L1 is no more than about 0.010 inches, but does not exceed the length of D1 due to molding considerations relating to the use of the small diameter pins needed to form such an orifice.

Orifice 44 is formed by using a mold pin with portions that together form orifice 44, angled passage 43 and longer passage 37. A separate mold pin is used to form shorter passage 39. These two mold pins come together and meet when the mold is closed to form restrictor 36. Wall 45 preferably has a 45° angle relative to the central long axis of orifice 44 to obtain optimum molding of orifice 44. The diameters D2 and D3 of passages 37 and 39 are preferably significantly larger than the diameter D1 of orifice 44 so that orifice 44 acts to control the liquid flow rate and thus, the dilution ratio of additive liquid 26 to the main liquid passing through channel 18. For convenience, D2 and D3 typically have the same diameter. Typically, L2 and L3 are longer than L1 and L2 is longer than L3. The values of L2 and L3 can also affect the dilution ratio obtained depending upon the viscosity of the additive liquid.

The orientation of the restrictor 36 in diptube 30 can affect the dilution ratios obtained. To obtain more accurate dilution ratios, each restrictor 36 should be inserted into passage 40 of tube 30 such that longer passage 37 faces toward end 41 of tube 30.

Although restrictors 36, 36' and 36" may be placed anywhere along passages 16, 19 or 40, more accurate dilution ratios are obtained, especially when higher dilution ratios are desired, when each restrictor 36 used is in close proximity to the other restrictors as shown in FIG. 1. "Close proximity" means that each restrictor 36 is positioned so as to be nearly touching the next restrictor 36. Once a steady state flow of main liquid stream has been established, the placement of each restrictor 36 will not have a significant effect on the dilution ratio. However, when small amounts of solution are desired, the placement of each restrictor 36 in close proximity to the next one tends to reduce any viscosity effects on the start of the flow of additive liquid 26 into the main liquid stream and thus provides a more accurately diluted solution of additive liquid 26.

Restrictor 36 can be made from any plastic material which can be molded, particularly by injection molding, such as polyethylene, polypropylene or polysulfone. Polypropylene is presently preferred because of its solvent resistance to common cleaning and maintenance chemicals.

The dimensions of tube 14 and channel 18 are selected in conjunction with the size of orifice 44 and the number of restrictors 36 to be used to obtain the desired volume dilution ratio, also taking into consideration the passage diameters and land lengths of present in each restrictor 36. It is also contemplated that the orifice 44 used in one restrictor need not have the same diameter and land length as the orifice 44 used in the second orifice. That provides more flexibility in obtaining the desired volume dilution ratio of additive liquid to main liquid. If desired, three or more restrictors could be used to achieve the desired volume dilution ratio as will be shown in the following Examples.

Likewise, an orifice, such as one having a nominal diameter of 0.080 inches could be placed in plug 33 to which diptube 30 is attached. Such an orifice could also be in the aspirator 12 itself at the point where tube 14 meets chamber 18 (the latter in the manner shown in the Horvath et al.

patent application noted above). In any event, there must be at least two restrictors of the type described herein present in the aspirator device of the present invention. In that case, the orifice in the plug or aspirator combines with the orifices present in the restrictors to achieve the desired volume dilution ratio.

INDUSTRIAL APPLICABILITY

The improved aspirator device of the present invention is particularly useful in conjunction with the accurate delivery of diluted solutions made from highly concentrated liquids. Such solutions can be used as disinfectants, hard surface cleaners for floors, windows and the like, degreasers, mildewcide, fungicide and insecticide solutions, floor polishes, and the like.

EXAMPLES 1–3

These Examples show the ability of the restrictors of the present invention to achieve accurate volume dilution ratios when used in a commercial S.C. Johnson Professional SOLUTIONS CENTER™ aspirator blending system. In these Examples, the aspirator used the SOLUTIONS CENTER™ system was part no. 10034004 commercially obtained from Hydro Systems Company of Cincinnati, Ohio which was connected to a standard utility water supply line. The water pressure reaching the aspirator was adjusted by a regulator to be 40 pounds per square inch gauge with a flow rate through the aspirator of 3.6 gallons per minute. A flexible tube containing a check valve was connected by way of a conventional screw cap to a reservoir container of the type sold by S. C. Johnson Professional for use with the SOLUTIONS CENTER™. That container had a plastic plug in the neck of the container which contained an orifice of 0.043 inches in diameter. The plastic diptube connected to the plug had the same appearance as shown in FIG. 1 although a different number of restrictors as indicated in each Example. The additive liquid used was J-512 Sanitizer, a sanitizer product concentrate commercially available from S. C. Johnson Professional Division of S. C. Johnson & Son, Inc.

In these Examples, one, two or three restrictors of the type shown in FIG. 2 were used where the nominal value of D1 was 0.006 inches and the nominal value of L1 was 0.040 inches, and the remaining passages in the restrictor had nominal values of D2=0.050 inches, D3=0.050 inches, L2=0.245 inches, and L3=0.100 inches.

The results of the testing are shown in Table I. Each Example was composed of three Runs (A, B and C). The volume dilution ratio of the solution obtained from each Run was measured by taking a five gallon sample of solution from the aspirator device and determining the volume dilution ratio by weight difference based on the amount of water and additive liquid used. The calculated volume dilution ratios obtained are reported in Table I.

Example 1 is a comparative Example that uses one restrictor of the type described above. Examples 2 (using two of the same size of restrictors) and 3 (using three of the same size of restrictors) show the ability of two or three, respectively, restrictors to achieve much higher volume dilution ratios with reasonably good accuracy without the need to use a single restrictor with a much smaller orifice.

TABLE I

| Example | Run A | Run B | Run C |
| --- | --- | --- | --- |
| 1 | 1:1299 | 1:1288 | 1:1346 |
| 2 | 1:1918 | 1:1882 | 1:1882 |
| 3 | 1:2504 | 1:2478 | 1:2469 |

Other modifications and variations of the improved aspirator device of the present invention will become apparent to those of ordinary skill in the art from the examination of the above specification and drawings. Thus, other variations of the improved aspirator device of the present invention may be made which fall within the scope of the appended claims, even though such variations were not specifically discussed above.

That which we claim is:

1. In an aspirator device for accurately blending a pressurized main liquid passing through an aspirator with a metered quantity of an additive liquid contained within a reservoir wherein passage of main liquid through the aspirator causes the additive liquid to be drawn into the main liquid by way of venturi action from the reservoir through a metering means, the improvement characterized by the metering means comprising at least two molded plastic liquid flow restrictors that are in serial flow communication with the additive liquid and wherein each restrictor is positioned so as to be nearly touching the next restrictor, each such restrictor having as its smallest diameter fluid passage a hollow bore of from about 0.005 inches to 0.010 inches in diameter and up to about 0.010 inches in length wherein the length does not substantially exceed the diameter and the amount of main fluid flowing through the aspirator and the dimensions of each hollow bore are such as to provide a volume:volume dilution ratio of the additive liquid to the main liquid of from about 1:500 to 1:2,500.

2. The improved aspirator device of claim 1 wherein the dilution ratio is from about 1:1,000 to 1:2,500.

3. The improved aspirator device of claim 1 wherein the metering means comprises at least three restrictors.

4. The improved aspirator device of claim 3 wherein the dilution ratio is from about 1:1,000 to 1:2,500.

* * * * *